Jan. 6, 1948.  J. FAIRHURST  2,433,895
SPEEDOMETER SWITCH
Filed Dec. 30, 1944  2 Sheets-Sheet 1

Inventor
JOHN FAIRHURST,
By Clarence A. O'Brien
and Harvey B. Jacobson
Attorneys Jan. 6, 1948.  J. FAIRHURST  2,433,895
SPEEDOMETER SWITCH
Filed Dec. 30, 1944  2 Sheets-Sheet 2
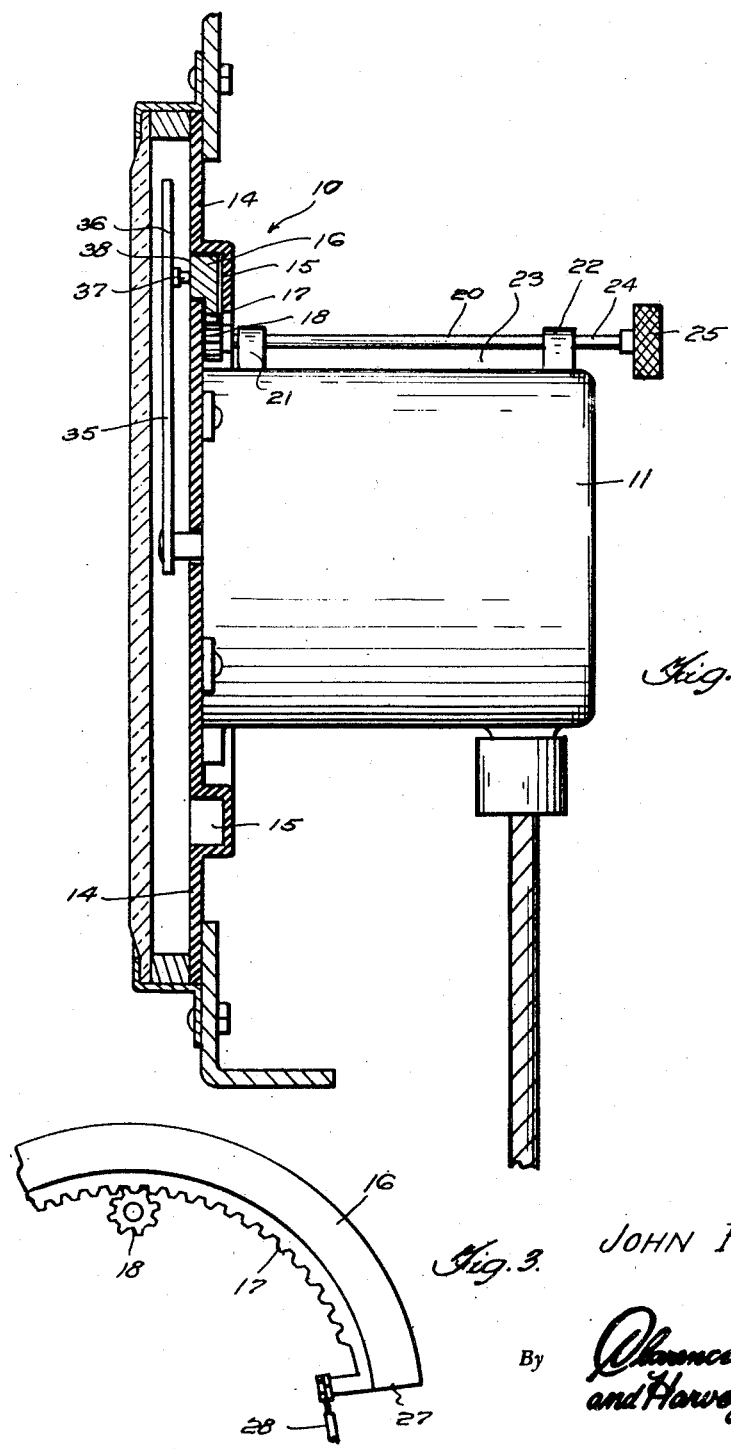
Inventor
JOHN FAIRHURST,
By *Clarence A. O'Brien*
and *Harvey B. Jacobson*
Attorneys Patented Jan. 6, 1948

2,433,895

UNITED STATES PATENT OFFICE 2,433,895

SPEEDOMETER SWITCH

John Fairhurst, Miami, Fla.

Application December 30, 1944, Serial No. 570,651

2 Claims. (Cl. 200—56)

This invention relates to speedometers and has for its object to provide a safety speedometer which will indicate audibly when a certain speed has been reached. Another object of the invention is to provide a switch for a combined visual and audible speedometer.

A further object of the invention is to provide a switch for an audible speedometer having means whereby the same may be set to give an alarm when a predetermined speed has been reached.

A still further object of the invention is to provide a switch for a speedometer so constructed as to operate an electric buzzer or other soft sound device when a predetermined speed has been reached and to continue the sound as long as same or greater speed is maintained.

Other features and advantages will become more readily apparent from the following description and the accompanying illustrative drawings in which:

Figure 2 is a vertical sectional view thereof, and

Figure 3 is an enlarged detail of an adjustable contact member.

Figure 1:
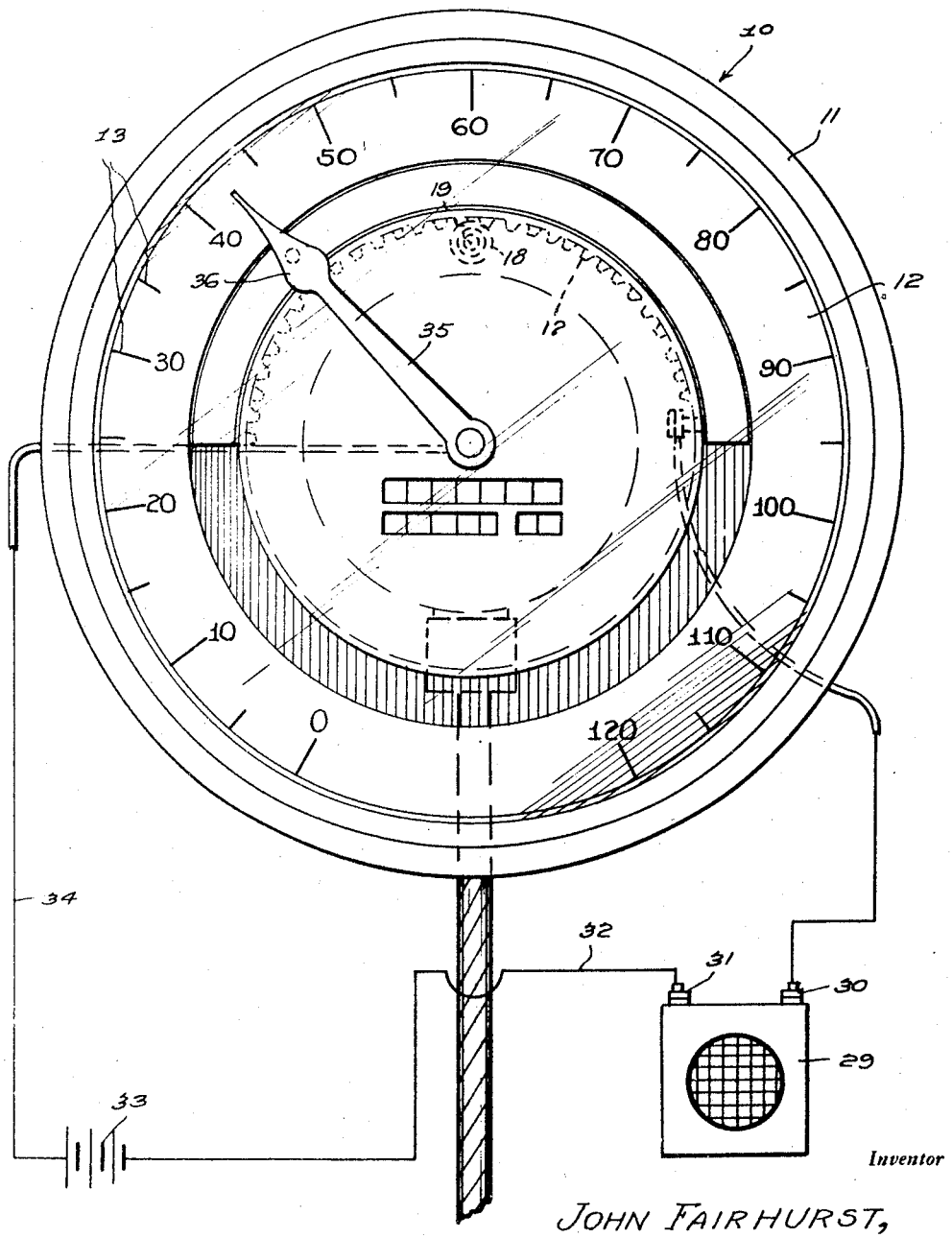
Figure 1 is an elevational view of my invention.

In the accompanying drawings as above enumerated and in the following specification, like characters of reference indicate like parts throughout and in which 10 indicates a speedometer embracing my invention and which includes a speedometer 11 having a non-conducting dial 12 with the usual speed indicia 13 provided thereon. The dial face 14 is provided with a set-in annular track 15, within which is seated a segmentally formed contact member 16 having an inner arcuate rack 17 engageable by the pinion 18 or the inner end 19 of a shaft 20 mounted in bearings 21 and 22 attached to the outer wall 23 of the speedometer 11. The projecting end 24 of shaft 20 is provided with a knurled head 25, by means of which the shaft may be readily turned to align an end of member 16 with any one of the speed indicating indicia 13. Attached to the end 27 of member 16 is an electric conductor wire 28 which leads to a buzzer or any other sounding device 29, connecting with the post 30. The post 31 on the sounding device 29 is connected by means of the conductor wire 32 to a battery 33, which may be the battery of the car upon which the device is used. A wire 34 leads to the dial hand 35 and pointer 36 which supports an inwardly projecting pin 37 adapted to bear lightly upon the face 38 of contact 16, in order that when the pointer 36 reaches the end of member 16, the pin 37 will contact said member thereby closing the circuit to the buzzer causing the same to be sounded.

A particular advantage of the device is that the member 16 may be quickly set to audibly indicate any rate of speed shown on the dial 12, by simply turning the head 25 of shaft 20 in order to adjust member 16 to a position opposite the desired speed.

It will be clear from the above description that I have designed a safety device of great importance, as, with its use, the driver of a car can at all times keep his eyes on the road and not have to refer constantly to the speedometer in order to know that he is keeping his speed within the law, and it is plain to see that many accidents will be avoided.

Attention is called to the fact that allowed speed varies in different States and in different localities in each State, therefore my device may be quickly adjusted in accordance with the speed allowed, wherever a car is being driven.

It is thought that persons skilled in the art to which the invention relates will be able to obtain a clear understanding of the invention after considering the descriptiin in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. The combination of a speedometer having a dial of non-electricity conducting material formed with an integral set-in circumferential track, a presettable arcuate speed indicating rack of electricity conducting material adjustably supported in said track to indicate a selected speed, a contact on said rack, a rotatable dial hand associated with said dial, and a contact on said hand engageable with said first mentioned contact when the speed of the vehicle reaches the preselected speed shown by the speed indicating rack.

2. The combination of a speedometer having a dial of non-electricity conducting material formed with an integral set in circumferential track, a presettable arcuate speed indicating rack of electricity conducting material adjustably supported in said track to indicate a selected speed, a contact on said rack, a rotatable dial hand associated with said dial, and a contact on said hand engageable with said first mentioned contact when the speed of the vehicle reaches the preselected speed shown by the speed indicating rack, and a rotatable pinion engageable with said arcuate rack for varying the position of the speed indicating rack and contact with respect to said dial.

JOHN FAIRHURST.

REFERENCES CITED

The following references are of record in the file of this patent:

UNITED STATES PATENTS

| Number | Name | Date |
| --- | --- | --- |
| 996,120 | Norton | June 27, 1911 |
| 1,083,525 | Evans | Jan. 6, 1914 |
| 1,190,115 | Compton | July 4, 1916 |
| 1,263,280 | Paulson | Apr. 16, 1918 |
| 2,154,670 | Donally | Apr. 18, 1939 |
| 2,178,986 | Caldwell | Nov. 7, 1939 |
| 2,229,592 | Rosenfeld | Jan. 21, 1941 |
| 2,231,111 | Caldwell | Feb. 11, 1941 |